United States Patent [19]

Baermann

[11] 3,708,177
[45] Jan. 2, 1973

[54] MAGNETIC SEAL FOR A ROTARY SHAFT AND MAGNET THEREFOR

[76] Inventor: Max Baermann, 506 Bensburg, Cologne, Germany

[22] Filed: June 17, 1970

[21] Appl. No.: 47,024

[52] U.S. Cl. ..................277/80, 148/103, 264/24, 264/DIG. 58
[51] Int. Cl. .............................................F16j 15/54
[58] Field of Search ...335/302, 296; 277/80; 251/65; 29/607, 608; 148/103; 264/24, DIG. 58

[56] References Cited

UNITED STATES PATENTS

| | | | |
|---|---|---|---|
| 3,236,928 | 2/1966 | Blume | 264/DIG. 58 |
| 3,306,621 | 2/1967 | Fisher | 277/80 |
| 2,913,289 | 11/1959 | Stevenson | 277/80 |
| 2,685,463 | 8/1954 | Pollard | 277/80 |
| 2,812,203 | 11/1957 | Scholten | 335/302 |
| 3,409,038 | 11/1968 | Blackford | 251/65 |
| 3,050,319 | 8/1962 | Colby | 277/80 |

Primary Examiner—Robert G. Nilson
Attorney—Meyer, Tilberry and Body

[57] ABSTRACT

A magnetic seal for a rotary shaft includes a cylindrical magnetic member surrounding the shaft. The magnetic member includes an outer circumferential seal cooperating with a housing through which the shaft projects. A cylindrical magnetically attractive member also surrounds the shaft and includes an inner circumferential seal cooperating with the shaft. The magnetically attractive member rotates with the shaft and the magnet is stationary with the housing. A sealing member is interposed between the magnet and the magnetically attractive member. Magnetic attraction between the magnet and the magnetically attractive member draws the two members together to form a seal with the interposed sealing member. The magnet is molded of anisotropic ferrite permanent magnet material which is oriented in a radial direction during molding and is also radially magnetized.

16 Claims, 8 Drawing Figures

INVENTOR.
MAX BAERMANN
BY
Meyer, Tilberry & Body
ATTORNEYS

PATENTED JAN 2 1973 3,708,177

INVENTOR.
MAX BAERMANN
BY Meyer, Tilberry & Body
ATTORNEYS

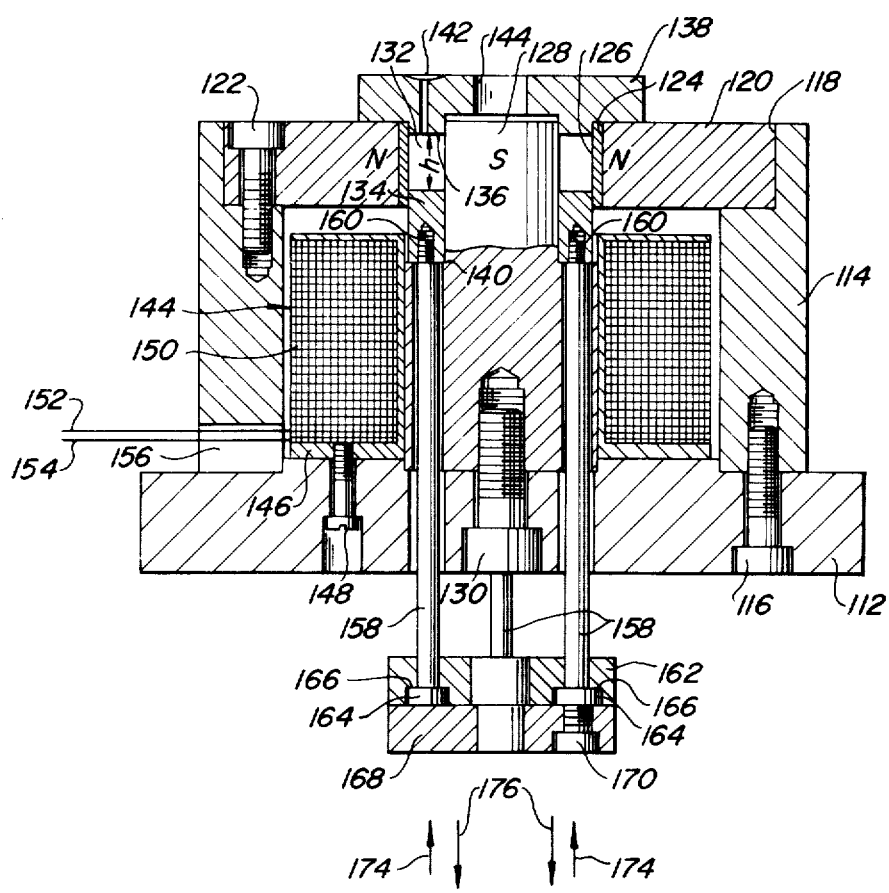

MAGNETIC SEAL FOR A ROTARY SHAFT AND MAGNET THEREFOR

BACKGROUND OF THE INVENTION

This application pertains to the art of magnetic seals for rotary shafts and magnets for use therein. The invention is particularly applicable for sealing rotary shafts where pressure differentials exist although it will be appreciated that the invention has broader applications and may be used in other environments.

Magnetic seals for rotary shafts commonly include a first element defined by a cylindrical sleeve magnetic member surrounding the shaft and a second element defined by a cylindrical sleeve magnetically attractive member surrounding the shaft. One of the members is rotatable with the shaft and the other members is fixed against rotation relative to the shaft. A sealing means is interposed between the shaft and the one member which rotates with the shaft, and another sealing means is interposed between the magnet and the magnetically attractive member. At least one of the members is shiftable axially of the shaft under influence of magnetically attractive force between the magnet and the magnetically attractive member.

In previous arrangements of the type described, the cylindrical sleeve magnet has been magnetized in a direction across its diameter so as to have a north magnetic pole at one location on the periphery thereof and a south magnetic pole diametrically opposite the north magnetic pole on the periphery thereof. With such magnetization, the lines of magnetic flux extend circumferentially in the walls of the magnet. With such an arrangement, during relative rotation between the magnet and the magnetically attractive member, pole changing occurs continuously in the magnetically attractive member. That is, one point on the magnetically attractive member continuously changes during rotation thereof from being influenced by the north magnetic pole to the south magnetic pole. This movement of the magnetically attractive member through the magnetic field produces eddy currents in the magnetically attractive member. These eddy currents can cause the magnetically attractive member to become hot, and damage to the sealing means may occur. In addition, the eddy currents produce their own magnetic field which operate in opposition to the magnetic field of the magnet and tend to demagnetize it. Therefore, the magnetically attractive force between the magnet and the magnetically attractive member is reduced by the opposing magnetic fields produced by the eddy currents. At a sufficiently high relative rate of rotation, the magnetic attraction between the magnet and the magnetically attractive member will be reduced to substantially zero due to the opposite magnetic field produced by eddy currents.

It would be desirable to have a magnetic seal for rotary shafts which is not subject to the problems described.

SUMMARY OF THE INVENTION

In accordance with the present invention, a shaft seal of the type described is provided with an improved cylindrical magnet molded of anisotropic ferrite permanent magnet material including magnetic particles and a plastic binder. More specifically, a powdered magnetic material is mixed with a thermoplastic material and the mixture is heated so that the plastic is in a fluid state. The mixture is then injected into a mold which is shaped to form a substantially cylindrical sleeve magnet having radially spaced inner and outer circumferential surfaces and opposed end surfaces. The material in the mold, while it is in a fluid state, is subjected to a magnetic field acting radially around the entire circumference. This aligns the magnetic particles radially in the preferred direction of their easy magnetization so that the cylindrical magnet will have improved magnetic strength in that direction. Upon cooling of the plastic material and removal of the mixture from the mold, the cylindrical magnet member is also radially magnetized. That is, the cylindrical member is magnetized so that its entire outer circumferential surface defines one magnetic pole and its entire inner circumferential surface defines another magnetic pole. With such a magnet, the magnetic field acts substantially radially along curved lines extending from the outer circumferential surface to the inner circumferential surface outwardly of an end surface of the magnet. The use of such a magnet in a rotary seal of the type described produces no flux reversals in the magnetically attractive member so that eddy currents are not produced.

In accordance with a preferred arrangement, a pair of inner and outer radially spaced sleeve members of a material having a high magnetic permeability are provided for increasing the strength of the magnetic field. The inner sleeve member is positioned in engagement with the inner cylindrical surface of the magnet and the outer sleeve member is positioned in engagement with the outer cylindrical surface of the magnet. The inner and outer sleeve members have end portions positioned adjacent one end surface of the cylindrical magnet. The sleeve members serve to collect the magnetic field lines from along the axial length of the inner and outer cylindrical surfaces and concentrate the field at one end surface thereof. In one arrangement, the inner and outer sleeve members have end portions which project radially toward one another in overlying relationship to one end surface of the cylindrical magnet. With such an arrangement, a sealing means may be trapped between an end surface of the cylindrical magnet and the radially extending end portions of the sleeve members.

In one arrangement, the cylindrical magnet has a circular groove formed in one end surface thereof intermediate the inner and outer circumferential surfaces. The groove receives one portion of a circular sealing ring which has another portion projecting axially outward beyond the end surface of the magnet member. In the preferred arrangement, the sealing ring is secured in the groove, as by adhesive or the like, to prevent relative rotation between the magnet member and the sealing ring. Relative rotation between the magnet member and the sealing ring could cause rapid deterioration of the magnet member during use thereof in a shaft seal of the type described.

It is a principle object of the present invention to provide a magnetic seal for rotary shafts which is not subject to overheating or loss of magnetic attraction due to eddy currents.

It is also an object of the present invention to provide an improved magnet for use in seals of the type described.

It is also an object of the present invention to provide a magnetic seal for rotary shafts which is more economical than previous constructions.

It is another object of the present invention to provide an improved method for making a cylindrical magnet and providing it with a very strong radial magnetization.

BRIEF DESCRIPTION OF THE DRAWING

The invention may take physical form in certain parts and arrangements of parts, a preferred embodiment of which will be described in detail in this specification and illustrated in the accompanying drawings which form a part hereof.

FIG. 8 is a cross-sectional elevational view showing a mold in which the magnet of the present invention is formed.

DESCRIPTION OF THE PREFERRED EMBODIMENT

Figure 1:
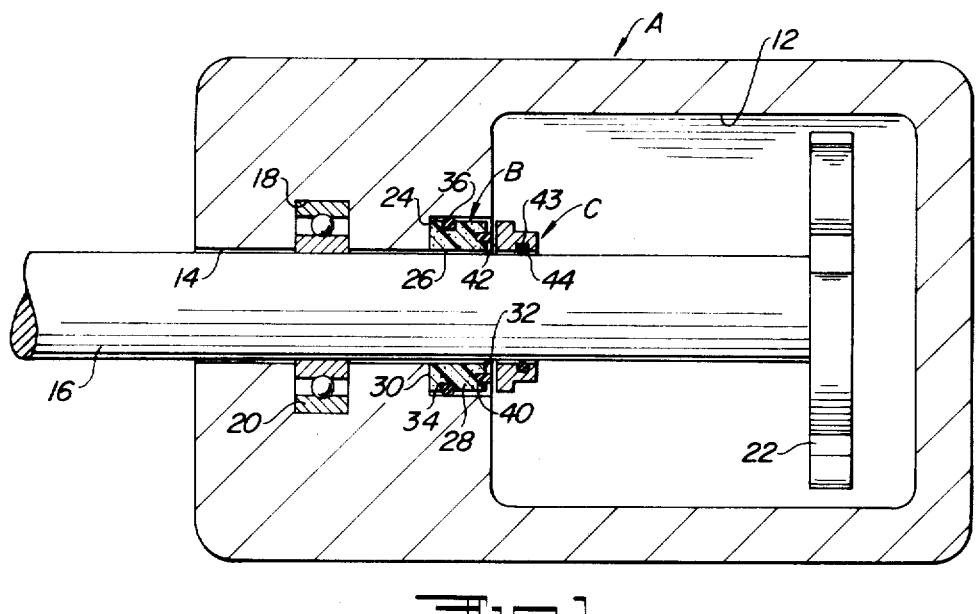
FIG. 1 is a cross-sectional elevational view showing a seal for a rotary shaft having the improvement of the present invention incorporated therein.

Referring now to the drawing, wherein the showings are for purposes of illustrating a preferred embodiment of the invention only and not for purposes of limiting same, FIG. 1 shows housing A of a fluid pump or the like. Housing A includes a cavity 12 having suitable inlet and outlet ports in a known manner. Housing A is formed with a cylindrical bore 14 through which rotary shaft 16 extends. Housing A further includes a circumferential recess 18 supporting a bearing 20 in which shaft 16 is rotatably mounted. Shaft 16 is rotatably driven by any suitable motor in a known manner and includes an impeller 22 mounted on one end thereof within cavity 12. In structures of the type described, it is often desirable to prevent leakage either into or out of cavity 12 along shaft 16. Therefore, a seal is provided along shaft 16 for preventing leakage which may be caused either by a high pressure or vacuum differential. It will be recognized that the fluid pump is only diagramatically described for purposes of illustrating the present invention and the seal of the present invention is useable in a variety of environments where it is desired to seal a rotary shaft. The present invention is also useful for preventing leakage from bearings or the like.

In one arrangement, housing A is formed with a cylindrical recess 24 of a larger diameter than bore 14. A cylindrical magnet member B is received on shaft 16 and positioned in recess 24. Magnet B includes an inner circumferential surface 26 and an outer circumferential surface 28. Outer circumferential surface 28 is spaced radially outward from inner circumferential surface 26 a distance which is substantially less than the axial length of magnet member B. Magnet member B further includes opposed end surfaces 30 and 32. Outer circumferential surface 28 is formed with a circumferential groove or recess 34 which receives an O-ring 36 of neoprene or other suitable elastomeric material. O-ring 36 is tightly compressed between the bottom of groove 34 and the periphery of recess 24. Preferably, O-ring 36 is compressed sufficiently to provide a frictional force which holds magnet B against rotation with shaft 16. It will also be recognized that it is possible to key magnet B to housing A for preventing rotation thereof if so desired. In addition, it will be recognized that housing A may represent only one half of an axially split housing so that two identical such housings may be bolted together with suitable gasketing between their contacting surfaces. In such an arrangement, the parts described may be positioned on shaft 16 and placed in one half of the housing before bolting of the other housing half thereto. Inner circumferential surface 26 preferably has a diameter slightly larger than the diameter of shaft 16 so there will be no contact between shaft 16 and magnet member B.

In accordance with one arrangement, magnet member B is formed with a circular groove or recess 38 in end surface 32 intermediate inner and outer circumferential surfaces 26 and 28. Circular groove 38 receives one end portion of a cylindrical sealing ring 40. Sealing ring 40 is preferably formed from such materials as polytetrafluoroethylene, or a polyamide having a lubricant such as graphite mixed therein, or a graphite. Sealing ring 40 is preferably secured in circular groove 38 against rotation relative to magnet member B. In a preferred arrangement, sealing ring 40 is adhesively secured within circular groove 38 by applying adhesive within groove 38 and to one end portion of sealing ring 40. However, it will be recognized that mechanical means may be provided to prevent rotation of sealing ring 40 relative to magnet member B as by extending a pin radially of magnet member B through inner circumferential surface 26 and through groove 38 when sealing ring 40 is positioned therein. Likewise, it is possible to provide a radially extending key projection on sealing ring 40 and an axially extending recess in the outer wall of groove 38 for receiving the key projection. With sealing ring 40 positioned in groove 38, sealing ring 40 includes a portion projecting axially beyond end surface 32 as shown in FIG. 1.

A magnetically attractive member C, of substantially cylindrical shape and of such material as case hardened steel, is also received on shaft 16 adjacent magnet member B. Magnetically attractive member C includes an inner circumferential groove 43 which receives an O-ring 44 of neoprene or other suitable elastomeric material. O-ring 44 is a tight fit on shaft 16 and is tightly compressed between the bottom of groove 43 and the outer periphery of shaft 16. The frictional gripping provided by O-ring 44 on shaft 16 is preferably sufficient so that magnetically attractive member C rotates with shaft 16. It will be recognized that it is also possible to key magnetically attractive member C to shaft 16 for rotation therewith if so desired. Magnetically attractive member C may have one end surface portion 42 polished so as to be very smooth if so desired. With one end portion 46 of sealing ring 40 positioned in circular groove 38, and other end 48 of sealing ring 40 projecting outwardly beyond end surface 32 of magnet member B, end surface 42 of magnetically attractive member C cooperates with end 48 of sealing ring 40 to provide a radial seal.

With the arrangement described, the gripping of O-ring 36 against the periphery of recess 24 may be such as to allow axial movement of magnet member B along shaft 16. In addition, gripping of O-ring 44 on shaft 16 may be such as to permit axial movement of magnetically attractive member C along shaft 16. It will be recognized that either magnet member B or magnetically attractive member C, or both, may be capable of relative axial movement along shaft 16. Magnetic attraction between magnet member B and magnetically attractive member C will draw these two members together until end 48 of sealing ring 40 contacts end surface 42 of magnetically attractive member C. With the arrangement described, O-ring 44 prevents leakage along shaft 16, while O-ring 36 prevents leakage axially along recess 24. Engagement between sealing ring 40 and end surface 42 prevents radial leakage. In order to prevent a magnetic short circuit, housing A is made of diamagnetic material, or an insert of diamagnetic material is positioned in housing A around magnet member B. Such diamagnetic material may be non-magnetic steel alloy, bronze or synthetic plastic.

In operation, magnetically attractive member C and O-ring 44 rotate with shaft 16 while magnet B and O-ring 36 are nonrotating. Cooperation between end surface 42 of magnetically attractive member C and end 48 of sealing ring 40 provide a sliding radial seal. The low friction material of which sealing ring 40 is made, and polished end surface 42 of magnetically attractive member C, provide insufficient rotary frictional clutching action to rotate magnet member B against the frictional gripping action of O-ring 36. In addition, the material of which magnet member B is formed will wear away more rapidly than magnetically attractive member C and securement of sealing ring 40 within circular groove 38 prevents rapid deterioration of magnet member B.

In the arrangement described, magnet member B has an outer diameter of approximately 60 millimeters and an inner diameter of approximately 40 millimeters. The axial length between end surfaces 30 and 32 is approximately 20 millimeters. Groove 38 has a depth of approximately 3 millimeters, and sealing ring 40 has an axial length between end surfaces 46 and 48 of approximately 4 millimeters. When sealing ring 40 is positioned in groove 38, it projects outward from end surface 32 not greater than 1 millimeter. This projecting distance of sealing ring 40 is preferably even less than 1 millimeter so that end surfaces 32 and 42 will be as close as possible for optimum magnetic attraction.

In accordance with the invention, magnet member B is formed of a material which is normally non-magnetic but which may be made magnetic by subjecting it to a magnetic field. More specifically, magnet member B is formed of powdered material such as manganese bismuth, barium ferrite, lead ferrite or strontium ferrite. This powdered material is mixed with a thermoplastic material such as polystyrene, superpolyamide or the like. Magnetic member B has the magnetic particles therein radially oriented in the direction of their easy magnetization and is also radially magnetized. That is, cylindrical magnet member B is subjected to a magnetic field extending radially from longitudinal axis 51 radially outward toward outer circumferential surface 28.

Figure 2:
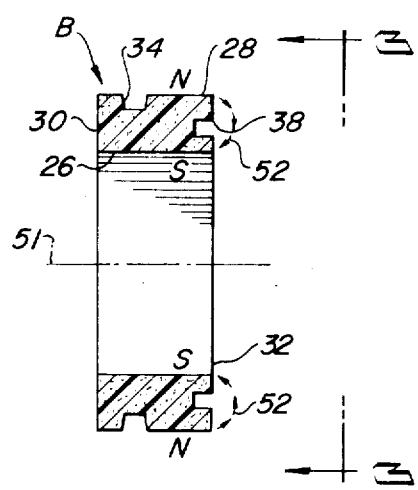
FIG. 2 is a cross-sectional elevational view of the improved magnet of the present invention.
Figure 3:
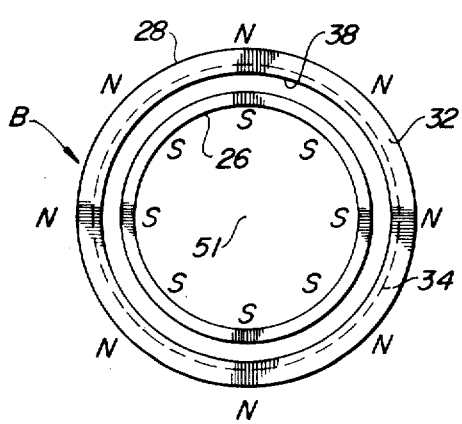
FIG. 3 is an end elevational view looking in the direction of arrows 3—3 of FIG. 2.
Figure 5:
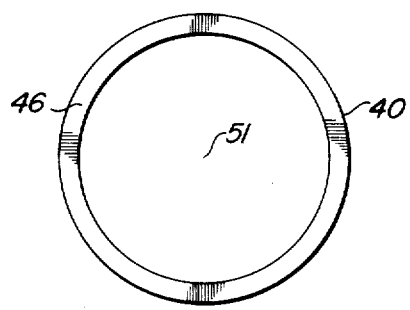
FIG. 5 is an end elevational view looking in the direction of arrows 5—5 of FIG. 4.

In the arrangement shown in FIGS. 2 and 3, magnet member B is radially magnetized so that outer circumferential surface 28 defines a north magnetic pole and inner circumferential surface 26 defines a south magnetic pole. It will be recognized that these poles may be reversed if so desired so that inner circumferential surface 26 would define a north magnetic pole and outer circumferential surface 28 would define a south magnetic pole. With magnet member B radially magnetized, magnetic flux acts in substantially radial directions as indicated by arrows 52 in FIG. 2. That is, the magnetic field acts in a substantially radial direction and extends from outer circumferential surface 28 to inner circumferential surface 26 outwardly of end surface 32. With this arrangement, it will be recognized that pole changing does not occur during relative rotation of magnetically attractive member C and magnet member B. That is, end surface 42 of magnetically attractive member C is always under the influence of a north magnetic pole in its outer peripheral area and under the influence of a southern magnetic pole at its inner peripheral surface. Therefore, magnetically attractive member C does not move through any alternating magnetic field and eddy currents are not developed in magnetically attractive member C. With no eddy currents developed, the magnetic attraction between magnet member B and magnetically attractive member C remains substantially constant regardless of the relative rotational speed between them. In addition, the absence of eddy currents in magnetically attractive member C prevents heat from being generated in magnetically attractive member C.

In the arrangement shown in FIG. 1, it will be recognized that more than one bearing may be provided if so desired, and that bearing 20 may be positioned on the opposite side of magnetic member B and magnetically attractive member C. Various arrangements are possible as is well known to those skilled in the art.

Figure 4:
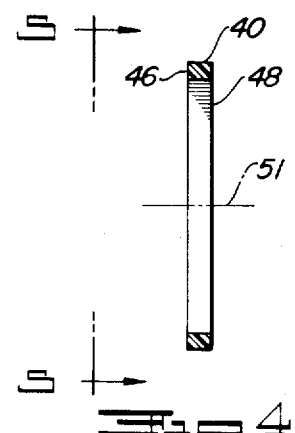
FIG. 4 is a cross-sectional elevational view of a sealing ring for use with the magnet of FIG. 2.
Figure 6:
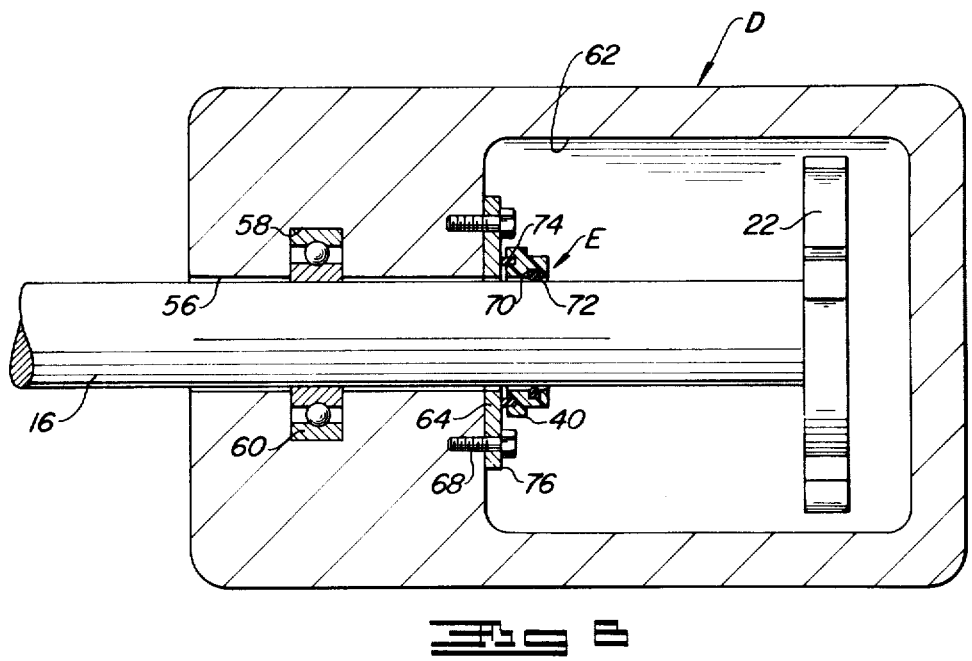
FIG. 6 is a cross-sectional elevational view similar to FIG. 1 showing another arrangement of a rotary shaft seal having the present invention incorporated therein.

In accordance with another arrangement, as shown in FIG. 6, a housing D includes a cylindrical bore 56 through which rotatable shaft 16 extends. Housing D includes a recess 58 for retaining bearing 60 in which shaft 16 is rotatably journaled. Enlarged recess 62 in housing D around shaft 16 has a ring 64 of case hardened steel secured against an end face 66 thereof as by bolts 68. A magnet member E, of material identical to that of magnet B and also being radially magnetized, is positioned on shaft 16. A circumferential groove 70 in the inner peripheral surface of magnet member E receives an O-ring 72 of neoprene or similar elastomeric material. O-ring 72 is compressed between the bottom of groove 70 and the outer periphery of shaft 16 so that magnet member E will normally rotate with shaft 16. A circular groove 74 in one end surface of magnet member E receives a sealing ring 40 which is identical in construction to the sealing ring of FIG. 4. Sealing ring 40 bears against the polished outer surface 76 of steel ring 64. Magnetic attraction between magnetic member E and steel ring 64 causes magnet member E to shift axially along shaft 16 and bring sealing ring 40 into engagement with the outer surface of steel ring 64. O-ring 72 prevents leakage axially along shaft 16, and contact between sealing ring 40 and steel ring 64 provides a radial seal. As in the previously described arrangement, sealing ring 40 is preferably secured against rotation within circular groove 74 of magnet member E.

In the arrangements of both FIGS. 1 and 6, it will be recognized that magnet members B or E define a first element and that magnetically attractive members C or 64 define a second element. In either case, one of the elements is rotatable with the shaft and the other of the elements is fixed against rotation relative to the shaft. In addition, each situation includes a sealing means interposed between the rotatable element and the shaft, and a second sealing means interposed between the first and second elements. In addition, at least one of the elements is capable of shifting axially relative to the shaft under the influence of magnetically attractive force between the first and second elements.

Figure 7:
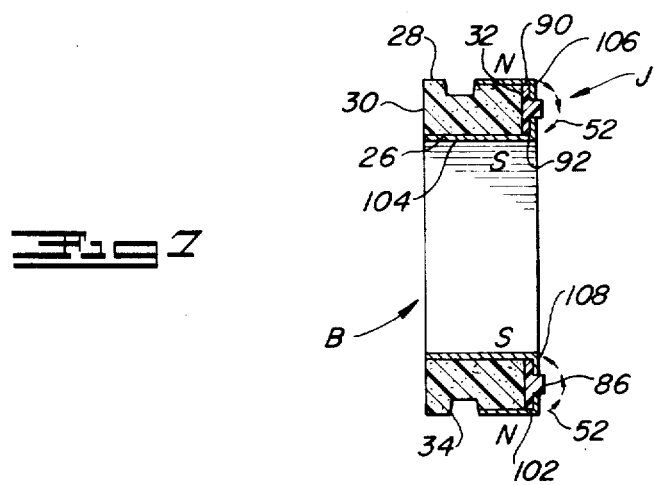
FIG. 7 is a cross-sectional elevational view showing the magnet of the present invention with means for increasing the field strength.

In accordance with another arrangement, magnet member B of FIG. 2 is formed without groove 38 as shown in FIG. 7. In this arrangement a circular sealing ring J having a T-shaped cross-section is used in place of sealing ring 40 of FIG. 4. T-shaped sealing ring J includes a main leg portion 86 extending axially outward from magnet end surface 32, and a pair of flange portions 90 and 92. Sealing ring J may also be molded into a circular ring from such materials as polytetrafloroethylene or a polyamide impregnated with lubricant such as graphite. Sealing ring J may then be adhesively secured to end surface 32 of magnet B. It will be recognized that mechanical securing means may also be provided as by inserting screws through flanges 90 and 92 into the end portion of magnet B. In accordance with a preferred arrangement of the present invention, magnet member B is provided with a means for concentrating lines 52 of magnetic force as shown in FIG. 7. A cylindrical steel outer sleeve 102 is positioned over magnet member B in engagement with a substantial portion of outer circumferential surface 28. In the arrangement shown, the outer diameter of magnet member B from circumferential groove 34 to end surface 32 is approximately 58 millimeters. Sleeve 102 has a wall thickness of approximately 1 millimeter and an axial length of approximately 11 millimeters. An inner cylindrical sleeve 104 is positioned inside of magnet member B in contact with inner circumferential surface 26. Sleeve 104 has a wall thickness of approximately 1 millimeter and an axial length of approximately 20 millimeters. Sleeve members 102 and 104 are of high magnetic permeability and serve to collect and concentrate lines 52 of magnetic force at end surface 32 of magnet member B. It will be recognized that it is possible to make sleeve members 102 and 104 a tight fit on magnet member B if so desired and it is also possible to adhesively secure the sleeve members to inner and outer circumferential surfaces 26 and 28 if so desired. With the arrangement shown in FIG. 7, the diameter of inner circumferential surface 26 is such that inner sleeve member 104 may be received therein and the internal diameter of sleeve 104 will be greater than the outer diameter of shaft 16.

Inner and outer sleeve members 104 and 102 have end portions which terminate adjacent end surface 32 of magnet member B. In a preferred arrangement, the end portions of sleeve members 102 and 104 project radially inward toward one another as at 106 and 108. These radially extending portions 106 and 108 terminate short of one another to provide a radial and circular opening through which main leg 86 of sealing ring J projects. Main leg 86 projects axially outward beyond the outer surfaces of radial portions 106 and 108 a distance not greater than 1 millimeter for contacting an end surface of an adjacent magnetically attractive member. In addition, radially extending portions 106 and 108 trap flanges 90 and 92 of sealing ring J against end surface 32 of magnet member B. In the arrangement shown, outer sleeve 102 has an axial length less than the axial length of inner sleeve 104. Outer circumferential surface 28 has a much greater area than inner circumferential surface 26 and the longer axial length of inner sleeve member 104 provides a pole concentration at end portion 108 which will be substantially equal to that at end portion 106 of outer sleeve member 102.

It will be recognized that sleeve members 102 and 104 may also be used with the embodiment of FIG. 2 in which sealing ring 40 is utilized. In such an arrangement, radially extending portions 106 and 108 of sleeve members 102 and 104 will contact end surface 32 of magnet member B. Sealing ring 40 is then made longer axially to project not greater than 2 millimeters from end surface 32 and not greater than 1 millimeter from the outer surfaces of radially extending portions 106 and 108. In the arrangement shown, sealing ring 40, and main leg 86 of sealing ring J, each have a radial thickness of approximately 3 millimeters, and the terminal ends of radially extending portions 106 and 108 are spaced apart approximately 3 millimeters. It will be recognized that it is also possible to use sleeve members 102 and 104 without radially extending portions 106 and 108 although the magnetic attraction will be less than optimum.

In accordance with the invention, the cylindrical magnet member is radially oriented during molding thereof so that the magnetic field capable of being produced by the magnet is greatly increased in strength. FIG. 8 shows a mold arrangement which includes a base plate 112 of iron to which an iron cylindrical member 114 is secured as by bolts 116. Member 114 has a circumferential recess 118 receiving the outer peripheral portion of an iron circular plate 120 which is secured in position by bolts 122. Circular plate 120 has a central circular bore 124 receiving a steel bushing 126. The mold includes a cylindrical core 128 of hardened steel which is secured to base plate 112 as by bolt 130. The inner circumferential surface of bushing 126 is spaced radially outward from the outer circumferential surface of core 120 to define a mold cavity 132. The bottom of mold cavity 132 is formed by a cylindrical ejecting ring 134 and the top by a projecting circumferential ring portion 136 on upper mold plate 138. Both upper mold plate 138 and ejecting ring 134 are made of diamagnetic material, such as non-magnetic steel alloy or bronze. The lower portion of core 128 is of a larger diameter than the upper portion thereof to provide a circumferential shoulder 140 against which the lower inner periphery of ejecting ring 134 abuts. This insures a constant height $h$ for mold cavity 132 after each ejection of a magnet and each back movement of ejecting ring 134. Upper mold plate 138 is provided with a sprue 142 and an air relief opening 144. A conventional injection molding nozzle cooperates with sprue 142 to inject magnet forming material into cavity 132.

An electrical coil 144 is positioned inside of ring 114. Coil 144 includes a body portion 146 secured to base plate 112 as by bolts 148, and an energizing winding 150 carried by body portion 146. Coil body portion 146 may be of such material as aluminum alloy. Electrical leads 152 and 154 for winding 150 extend through isolated bores as at 156 in ring 114.

The ejecting arrangement includes four circumferentially spaced pins 158 provided with threads on their upper end portions 160. Threaded end portions 160 are threaded into suitable threaded bores in ejecting ring 134. Pins 158 extend through holes in disc 162 and have enlarged heads 164 received in enlarged circular recesses 166 in disc 162. A second disc 168 is secured to disc 162 by bolts 170 so that enlarged heads 164 are trapped between discs 162 and 168.

When coil 144 is energized, magnetic poles indicated in FIG. 8 by letters N & S are formed in plate 120 and core 128. This produces a radial magnetic aligning field in mold cavity 132. As previously mentioned, the magnet material is preferably a powder of such materials as manganese bismuth, barium ferrite, lead ferrite or strontium ferrite, and this material is mixed with a small portion of thermoplastic material such as polystyrene or superpolyamide. The mixture is injected into cavity 132 through sprue 142. With the plastic still in a fluid state, and an electrical current energizing coil 144 through leads 152 and 154, the magnetic particles contained therein are capable of movement so that their preferred axes of magnetization are aligned by the magnetic field extending radially across cavity 132 rather than being randomly oriented. Maximum field strength is produced when the magnet is later radially magnetized. With the magnetic particles radially oriented under the influence of the magnetic field in the mold, they will remain radially oriented as the plastic cools to a rigid state. Once the plastic material has hardened or solidified, a cylindrical ring of solidified plastic and powdered permanent magnet material is provided, and the magnetic particles are radially oriented.

Once the magnet material in cavity 132 has solidified to a state in which the magnetic particles are held with their preferred axes of magnetization in alignment, the polarity of the electrical current applied to electrical leads 152 and 154 is reversed for a short time to reverse the direction of the magnetic field produced in cavity 132 by coil 144. This reversal of polarity substantially removes any magnetization which has been produced in the magnet material by the aligning field and removal of the solidified magnet material from cavity 132 is easier. Upper mold plate 138 is then separated from plate 120 and the ejecting device is operated to eject the solidified magnet material from mold cavity 132. Ejecting ring 134, pins 158, and discs 162 and 168 are moved in the direction of arrows 174 to eject a formed magnet from cavity 132. These members, which define the ejecting device, are moved in the direction of arrows 176 after ejection of a magnet until ring 134 abuts shoulder 140. The mold is then ready to form another magnet once upper mold plate 138 is moved back to the closed position shown in FIG. 8. The ejecting device may be operated mechanically or pneumatically. In a pneumatic arrangement, disc 168 is connected with the piston of a double acting air cylinder which is capable of moving the ejecting device in the direction of either arrows 174 or 176.

Once the solidified cylindrical ring of magnet material is removed from the mold, it is radially magnetized. That is, it is subjected to a magnetizing field acting radially relative to the longitudinal axis of the cylindrical magnet member, and in the same direction as the aligning field produced in cavity 132 by coil 144, so that the magnet member is provided with an outer circumferential surface defining one magnetic pole, and an inner circumferential surface defining another magnetic pole.

While certain preferred arrangements have been described in detail on this specification and illustrated in the accompanying drawing, it is obvious that modifications and alterations will occur to others skilled in the art upon the reading and understanding of this specification. The present invention includes all such equivalent modifications and alterations and is limited only by the scope of the claims.

Having thus described my invention, I claim:

1. A cylindrical magnet formed of powdered magnetic material, said magnet having radially spaced inner and outer cylindrical surfaces and opposite end surfaces, said magnet being radially magnetized so that one of said inner and outer cylindrical surfaces defines a north magnetic pole and the other of said inner and outer cylindrical surfaces defines a south magnetic pole, a circular groove formed in one of said end surfaces intermediate said inner and outer cylindrical surfaces, a circular sealing ring having a portion received in said groove and a portion projecting axially outward from said one end surface, and means fixing said sealing ring in said groove against rotation relative to said magnet.

2. The device of claim 1 wherein said magnet is molded of anisotropic ferrite permanent magnet particles dispersed in a plastic binder, said particles having preferred axes of magnetization oriented radially between said inner and outer cylindrical surfaces of said magnet.

3. The device of claim 1 wherein said magnet defines a first element and said inner cylindrical surface defines the surface of a bore through said magnet, a rotatable shaft extending through said bore, a second element defined by a circumferential magnetically attractive member surrounding said shaft, said second element having an end surface facing and engageable with said sealing ring, one of said elements being rotatable with said shaft and the other of said elements being fixed against rotation relative to said shaft, sealing means interposed between said one element and said shaft, and at least one of said elements being shiftable axially of said shaft toward the other of said elements under influence of magnetically attractive force between said first and second elements.

4. The device of claim 3 and further including a pair of radially spaced sleeve members of high magnetic permeability engaging said inner and outer cylindrical surfaces of said magnet, said sleeve members having sleeve end portions positioned adjacent said one end surface of said magnet.

5. The device of claim 4 wherein said sleeve end portions extend substantially radially toward one another and overlie said one end surface of said magnet.

6. A cylindrical magnet formed of powdered magnetic material, said magnet having radially spaced inner and outer cylindrical surfaces and opposite end surfaces, said magnet being radially magnetized so that one of said inner and outer cylindrical surfaces defines a north magnetic pole and the other of said inner and outer cylindrical surfaces defines a south magnetic pole, a pair of inner and outer radially spaced sleeve members of high magnetic permeability engaging said inner and outer cylindrical surfaces of said magnet, said sleeve members having sleeve end portions positioned adjacent at least one of said end surfaces of said magnet.

7. The device of claim 6 wherein said sleeve end portions project substantially radially of said magnet toward one another in overlying relationship to said one end surface.

8. The device of claim 7 and further including circular sealing means having a substantially T-shaped cross-sectional shape and being attached to said one end surface, said circular sealing means including a central leg portion projecting axially outward from said one end surface and a pair of side flange portions trapped between said one end surface and said sleeve end portions.

9. The device of claim 6 wherein said magnet is molded of anisotropic ferrite permanent magnet particles dispersed in a plastic binder, said particles having preferred axes of magnetization oriented radially between said inner and outer cylindrical surfaces of said magnet.

10. The device of claim 6 wherein said magnet defines a first element and said inner cylindrical surface defines the surface of a bore through said magnet, a rotatable shaft extending through said bore, a second element defined by a circumferential magnetically attractive member surrounding said shaft adjacent said magnet, said second element having a facing end surface facing said one end surface of said magnet, one of said elements being rotatable with said shaft and the other of said elements being fixed against rotation relative to said shaft, first sealing means interposed between said one element and said shaft, second sealing means interposed between said one end surface of said magnet and said facing end surface of said magnetically attractive member, and at least one of said elements being shiftable axially of said shaft toward the other of said elements under influence of magnetically attractive force between said first and second elements.

11. The device of claim 10 wherein said second sealing means is fixed against rotation relative to said magnet.

12. The device of claim 10 wherein said sleeve end portions extend substantially radially of said magnet toward one another, said second sealing means comprising a circular member having a substantially T-shaped cross-sectional shape including a control leg portion projecting axially of said shaft and a pair of side flange portions trapped between said one end surface of said magnet and said sleeve end portions.

13. A cylindrical magnet member molded of material including anisotropic ferrite permanent magnet particles dispersed in a plastic binder, said magnet having radially spaced inner and outer cylindrical surfaces and opposite end surfaces, said particles having preferred axes of magnetization, substantially all of said particles having said preferred axes of magnetization thereof aligned radially of said magnet member between said inner and outer surfaces within said plastic binder, said magnet member being radially magnetized so that one of said inner and outer surfaces defines a north magnetic pole and the other of said inner and outer surfaces defines a south magnetic pole, a circular groove formed in one of said end surfaces intermediate said inner and outer surfaces, a circular sealing ring having a portion received in said groove and a portion projecting axially outward from said one end surface, and means fixing said sealing ring in said groove against rotation relative to said magnet.

14. A cylindrical magnet member molded of material including anisotropic ferrite permanent magnet particles dispersed in a plastic binder, said magnet having radially spaced inner and outer cylindrical surfaces and opposite end surfaces, said particles having preferred axes of magnetization, substantially all of said particles having said preferred axes of magnetization thereof aligned radially of said magnet member between said inner and outer surfaces within said plastic binder, said magnet member being radially magnetized so that one of said inner and outer surfaces defines a north magnetic pole and the other of said inner and outer surfaces defines a south magnetic pole, a pair of inner and outer radially spaced sleeve members of a material having high magnetic permeability, said inner sleeve member being in engagement with said inner cylindrical surface and said outer sleeve member being in engagement with said outer cylindrical surface, and said sleeve members having end portions positioned adjacent at least one of said end surfaces.

15. The magnet member of claim 14 wherein said end portions of said sleeve members project radially toward one another in overlying relationship to said one end surface.

16. The magnet member of claim 15 and including sealing means of substantially T-shaped cross-section attached to said one end surface, said sealing means including a central leg portion projecting axially outward from said one end surface and a pair of side flange portions trapped between said one end surface and said radially extending end portions of said sleeve members.

* * * * *